United States Patent Office 3,749,587
Patented July 31, 1973

3,749,587
SWEETENED STORAGE STABLE PEANUT
BUTTER SPREAD
Fred W. Billerbeck, Lawrence H. Everett, and Craig T. Ritsema, Fremont, Mich., assignors to Gerber Products Company, Fremont, Mich.
No Drawing. Filed Sept. 1, 1971, Ser. No. 177,186
Int. Cl. A23l 1/36
U.S. Cl. 99—128                    7 Claims

ABSTRACT OF THE DISCLOSURE

A peanut-butter sweetening agent composition is provided having at least 5 weight percent based on solids of sweetening agent and a long shelf life substantially free of syneresis.

The composition is prepared by combining at an elevated temperature a mixture of milled peanuts, additional edible oils and a stabilizer with the sweetening agent having a small amount of edible hydrophilic substance. The resulting mixture may then be fed into containers and the containers sealed.

BACKGROUND OF THE INVENTION

Field of the invention

Peanut spreads or peanut butter find wide use as a staple item of diets. Peanuts are rich in protein, carbohydrates, and oils and therefore provide excellent nutrients. There have been continuing efforts to improve the acceptance of peanut butter, as to its flavor, composition, appearance and characteristics on the palate.

Because of the sweetening effect of honey or other sweetening agents, they provide a desirable additional ingredient. However, significant amounts of these sweetening agents cannot be added without concomitant problems in preparation of the combined composition and in stability on storage. In the past, the addition of large amounts of honey, for example, to peanut butter has lead to a plastic product, which could not be readily agitated and resulted in a product of undesirable texture and color.

Because the various ingredients employed in peanut butters are normally naturally derived, they are complex mixtures of a variety of materials having different physical and chemical properties. For example, peanuts are a combination of vegetable oils which are hydrophobic and lipophilic and proteins and carbohydrates which are hydrophilic and lipophobic. Honey and syrups, which are a combination of saccharides and water, are of course hydrophilic. In addition, the sugars and fats are both independently crystallizable, so that the final product is a complex combination of disparate compounds. Therefore, it is found that care must be taken in combining the various compounds and, frequently, in the materials used, so that the final product is substantially homogeneous and retains this character for long periods of time. Also, during the preparation of the compound, it is essential that the materials remain capable of being mixed to a homogeneous composition.

Description of the prior art

U.S. Pat. Nos. 2,079,288 and 1,890,180 teach the combination of relatively high concentrations of honey with peanut butter and a blending oil. U.S. Pat. No. 1,416,387 teaches combining honey and peanut butter. Finally, U.S. Pat. No. 3,044,883 teaches combining small amounts of honey with peanut butter and oils.

SUMMARY OF THE INVENTION

Milled peanuts, edible oil and stabilizer are mixed at an elevated temperature. The sweetening agent and hydrophilic substances substantially free of water are combined at an elevated temperature. The two compositions are then mixed at a temperature of at least about 145° F. for a time sufficient to provide substantial homogeneity and then cooled. The resulting product provides a smoothly textured storage stable product.

DESCRIPTION OF THE SPECIFIC EMBODIMENTS

The ingredients employed for the most part in the subject invention are peanut butter, an edible oil, an edible stabilizer, honey and hydrophilic additives. Before considering the process, the various ingredients will be discussed.

The first and major ingredient is the peanut butter which is prepared by milling of the clean kernels of roasted peanuts. This will be referred to as the primary milling. Various patents have issued describing methods of milling, e.g. U.S. Pat. No. 2,302,574. Peanuts have about 50 weight percent solids, the solids being a combination of protein and carbohydrate. The remaining material is peanut oil. When ground, the peanut oil is pressed out of the solids, so as to have a suspension of small solid particles in peanut oil. This peanut butter product is normally combined with a wide variety of additives to improve texture, taste, appearance and stability prior to being sold commercially.

The edible oil which is added may be a naturally occurring oil or a partially hydrogenated oil. These oils include peanut oil, corn oil, cotton seed oil, coconut oil, soy bean oil, or other equivalent edible oil.

A small amount of a stabilizer is also included. These stabilizers are well known in the art and are for the most part saturated fatty acid glycerides. The glycerides may be mono-, di, or tri glycerides and are primarily derived from hydrogenated vegetable oils or peanut oil. In addition, lecithin may be used either by itself or in combination with the saturated fatty acid glycerides.

The next ingredient is the sweetening agent. An exemplary sweetening agent is honey, which is for the most part an invert sugar. The composition is primarily dextrose (34%) and levulose (41%) with about 2.4% sucrose and enough water to make 100%. However, it is found the water may vary from about 13.4 to 22.9%, with concomitant reduction in the percentage of the other constituents although the ratios of the saccharides remain subsantially the same.

Other sweetening agents which may be employed are naturally occurring, naturally derived or synthetic groups. These syrups may be used in place of honey and employed in the subject process in substantially the same manner as the honey. Illustrative sweetening agents include corn syrup, sweetose, liquid sugar, maple syrup, etc. All of these compositions are for the most part aqueous concentrates of sugars, mono- and disaccharides, having less than about 40 weight percent water. The sweetening agents may be used individually or in combination. Preferably, at least 25, more usually at least 50 weight percent of the sweetening agent will be honey. The mono- and disaccharides include such materials as dextrose (glucose), which may be obtained as cerelose or corn sugar; maltodextrins, obtained from hydrolysis of corn starch or cereal solids; or sucrose. About half of the mono- and disaccharides may be replaced by partially hydrolyzed starch, such as dextrin, present in the malto-dextrin composition.

These sugar compositions are substantially anhydrous, having less than about 5 weight percent water. They also have at least one glucose unit.

The hydrophilic additives which are added to the honey are primarily edible materials which will enhance the flavor of the product. Suitable materials are substantially anhydrous monosaccharides, and disaccharides, particularly of 6 carbon sugars.

The other hydrophilic additive commonly used will be salt (sodium chloride), which is normally found in commercial peanut butter compositions.

Other materials which may be included in the final composition are peanut chunks, dieting supplements, etc. The peanut chunks may be used in an amount of from 0 to 20 weight percent of the final composition replacing an equal amount of peanut butter. Also among other materials, anticrystallization agents may be included in the composition. These will normally be present in less than about three weight percent of the final composition and are illustrated by sorbital, propylene glycol, oxystearin and glycerol.

The amount of peanut butter (solids and peanut oil) which is present in the final composition will generally be from about 60 to 75, more usually from 65 to 70 weight percent of the total composition. The added oil will generally vary from 6 to 24 weight percent, more usually from 10 to 20 weight percent of the total final composition. The stabilizer would usually be added to provide from 1 to 3 weight percent, more usually from 1.25 to 2.5 weight percent of the total final composition.

The sweetening agent is combined to provide a final concentration of at least 5 weight percent, and not greater than 25 weight percent, more usually from 10 to 22 weight percent based on the entire final composition. The saccharide additive will be added to provide at least about 2.5 weight percent and not more than about 5 weight percent total amount, more usually from about 3–4 weight percent total amount, based on the final composition. The salt is normally added to taste and will be at least about 0.2 and not more than 2, usually from about 0.3 to 1.5 weight percent based on the final composition. The hydrophilic additives should have less than 5 weight percent, usually less than 3 weight percent, and preferably less than about 1 weight percent water when added. This is particularly true of the saccharide additive.

As already indicated, the peanut butter is formed by the milling of peanuts according to conventional practices. The milled peanuts are discharged from the milling device at a temperature usually in excess of 140° F. and generally not in excess of about 210° F., more usually of from about 190–200° F. Various milling devices may be used, for example, a Cherry-Burrell, Vibra-Reactor Mill. The milled peanuts are combined with the edible oil and stabilizer, which depending on the available equipment, the edible oil and stabilizer may be metered directly into the peanut butter during the primary milling or immediately thereafter and prior to the secondary milling or texturizing milling of the peanut butter. Alternatively, the edible oil and stabilizer may be premixed and heated in the range of 150° to 175° F. This results in the melting of the stabilizer and aids the dispersion of the edible oil and stabilizer in the milled peanuts.

In a separate vessel, the sweetening agent is heated to a temperature of at least about 150° F. and not more than about 215° F., more usually in the range of about 170° to about 210° F. To this mixture is added the appropriate amount of the hydrophilic additives, particularly the saccharide and salt. Substantial homogeneity is readily achieved.

After the milled peanuts, edible oil and stabilizer have been mixed to provide substantial homogeneity, depending on the method employed this could be a few seconds to a number of minutes, the sweetening agent mixture is then added with agitation. The temperature is maintained in the range of from about 150° to 190° F., usually from about 155° to 175° F. The period of time for mixing is as short as necessary to insure complete dispersion of the various ingredients to provide a homogeneous and smoothly textured composition. Again, depending on the type of equipment, this could be a matter of seconds or many minutes.

Once the mixture has achieved the desired texture and homogeneity, it is then transferred, conveniently by means of a pump, into the containers, while maintaining the mixture at a temperature of at least about 85° F. and not more than about 125° F., more usually in the range of about 90° to 115° F. It is found that the particular temperature in which the containers are filled is frequently a function of the stabilizer which is employed. Various swept surface heat exchanging equipment may be used to provide the necessary cooling. Illustrative equipment includes the Themutator, supplied by Cherry-Burrell, and Creamery Package's St. Regis version.

By the choice of suitable equipment, the process may be carried out either as a batch process or as a continuous process. Conventional equipment can be used for metering the various ingredients so as to insure the proper proportions.

In order to demonstrate the subject invention, a number of compositions were prepared in accordance with the subject process. Milled peanuts at a temperature of about 195°–200° F. were introduced into a mixing kettle and combined with the edible oil and stabilizer which had been mixed and heated to a temperature of 160° F. The peanuts were milled in a single pass to the desired fineness by a Cherry-Burrel Vibra-Reactor Mill. A honey composition had been prepared by mixing, for a short period of time, honey heated to a temperature of 175° F., with salt and cerelose. After a short period of heating and agitation, the salt and cerelose completely dissolved. The final temperature was 200° F.

After the milled peanuts and mixture of edible oil and stabilizer had been agitated sufficiently, the honey composition was added and the entire mixture agitated at a temperature of about 160 to 165° F.

The mixture was then fed to containers employing a heat exchanger feed pump, where the temperature was controlled by adjustment of the pump speed. The temperature was controlled in the range of 90° to 115° F., which was found to vary with the particular stabilizer employed.

The following compositions were prepared and found to have the desired taste, texture, stability and appearance:

|  | Weight percent | | | | |
| --- | --- | --- | --- | --- | --- |
|  | 1 | 2 | 3 | 4 | 5 |
| Milled peanuts | 67.5 | 67.75 | 67.5 | 66 | 64 |
| Edible oils | 11 | 10 | 10 | 10 | 10 |
| Stabilizer | 1.5 | 1.75 | 2 | 1.5 | 1.5 |
| Salt | .5 | 1 | 1 | 1 | 1 |
| Cerelose | 3.5 | 3.5 | 3.5 | 3.5 | 3.5 |
| Honey | 16 | 16 | 16 | 18 | 20 |
| Milled peanuts | 80 |  | 75 |  | 69 |
| Edible oils | 8.25 |  | 8.25 |  | 9.25 |
| Stabilizer | 1.75 |  | 1.75 |  | 1.75 |
| Salt | 1 |  | 1 |  | 1 |
| Cerelose | 4 |  | 4 |  | 4 |
| Honey | 5 |  | 10 |  | 15 |
|  | 100.00 |  | 100.00 |  | 100.00 |

By contrast, when the process was deviated from, for by example, by mixing all the ingredients except the honey and then adding the honey, the viscosity of the mixture rapidly increased leading to pumping difficulties and only a small amount of product could be obtained. In another experiment, following the above procedure, except that cerelose was used having about 8–9% water, the form normally obtained commercially, but otherwise following the same procedure as described above, only a small amount of desired product could be obtained. The product was discharged from the feed pump in a non-plastic rope-like manner instead of the desired plastic semi-fluid state.

What is claimed is:

1. A method for preparing a desirably appearing, smoothly textured storage stable peanut butter/honey composition having at least 5 weight percent and not more than 25 weight percent of honey based on the total composition, comprising: combining as a first composition at an elevated temperature in excess of 175° F. but not more than 210° F. a major amount of milled peanuts with an edible oil and from about 1–3 weight percent of a saturated fatty acid glyceride; combining as a second composition, said honey with from about 2.5 weight percent to about 5 weight percent of a substantially anhydrous monosaccharide at a temperature of at least 150° F. but not more than 215° F.; and combining and mixing said first and second compositions at a temperature of from about 150° F. to about 190° F. so as to provide a substantially uniform composition.

2. A method according to claim 1, wherein said sweetened peanut butter composition is cooled to a temperature in the range of about 85° to 125° F. before introduction into containers.

3. A method according to claim 1, wherein said honey is present in from 12 to 22 weight percent of said composition and said milled peanuts is present in from 60 to 75 weight percent of the total composition.

4. A method according to claim 1, wherein said monosaccharide is present in from about 3 to 4 weight percent based on the final composition and additionally salt is added in from 0.2 to 2 weight percent based on the final composition.

5. A method according to claim 1, wherein from 0 to 20 weight percent of the peanuts present in said composition is present as chunk peanuts.

6. A method according to claim 1, wherein said temperature of said milled peanuts is in the range of 190° to 200° F. when combined with said edible oil and stabilizer and said honey composition is at a temperature in the range of about 170° to 210° F. when combined with said milled peanuts composition.

7. The product formed by the process of claim 1.

References Cited
UNITED STATES PATENTS

| | | | |
|---|---|---|---|
| 1,416,387 | 5/1922 | Sell | 99—128 |
| 2,079,288 | 5/1937 | Hoffman | 99—128 |
| 2,302,574 | 11/1942 | Richardson | 99—128 |
| 3,129,102 | 4/1964 | Sanders | 99—128 |
| 3,246,991 | 4/1966 | Aveia | 99—128 |
| 3,266,905 | 8/1966 | Baker | 99—128 |
| 3,671,267 | 6/1972 | Gooding | 99—128 |

FRANK W. LUTTER, Primary Examiner

R. HALPER, Assistant Examiner

U.S. Cl. X.R.

99—146